Nov. 28, 1950    C. M. SAVRDA    2,532,198
FISH FILLETING MACHINE
Filed Nov. 16, 1946    7 Sheets-Sheet 1

INVENTOR.
CHARLES M. SAVRDA
BY Wm. S. Pritchard
ATTORNEY.

Patented Nov. 28, 1950

2,532,198

UNITED STATES PATENT OFFICE 2,532,198

FISH FILLETING MACHINE

Charles M. Savrda, Bay Shore, N. Y., assignor, by mesne assignments, to Fish Machinery Corporation, Boston, Mass., a corporation of Delaware Application November 16, 1946, Serial No. 710,352

16 Claims. (Cl. 17—4)

1

This invention relates to filleting machines. More particularly, it relates to a new and improved apparatus for positioning a fish, and particularly the tail feather and dorsal fin thereof.

British Patent No. 637,126 accepted on March 3, 1950 discloses a new method and apparatus for filleting fish which is particularly adapted for the filleting of redfish and wherein, after a fish, tail leading and back downward, passes through the zone of action of a pair of spaced rotating circular back-slitting knives which slit the fish upwardly from the back, it is projected from the zone of action of the back-slitting knives onto a pair of ribbing knives disposed in position to permit the fish to assume approximately the path of travel which the fish naturally tends to take upon leaving the zone of action of the back-slitting knives. During passage through the zone of action of the back-slitting knives, the thin (unribbed) portion of the fish is slit upwardly from the back through the belly side, and thereafter the ribbed portion of the fish is slit upwardly through the back to the belly cavity in close proximity to the ribs and without passing through the belly cavity and without incising the belly side of the fish.

The back-slitting means consists of a pair of spaced rotating circular knives. A pair of spaced rotating hold-down discs cooperate with the back-incising knives to maintain the fish in position on the back-slitting knives. The hold-down discs are yieldingly mounted relative to the back-slitting knives whereby, as enlarged sections of the fish pass through the zone of action of the back-slitting knives, the hold-down discs will automatically be raised to accommodate the enlarged portions. The hold-down discs merely serve to maintain the fish in position on the back-slitting knives and do not incise the belly side of the fish. The fish is projected from the zone of action of the back-slitting knives and hold-down discs onto a pair of ribbing knives comprising a pair of spaced knives having cutting edges at the top thereof. The ribbing knives are spaced from each other to provide a passage adjacent the bottom thereof in which the backbone of the fish passes. The ribbing knives are substantially vertically disposed and substantially parallel at the forward portion and thereafter diverge outwardly and upwardly from the forward extremity to the rear thereof. The ribbing knives sever the fillets from the backbone and ribs to which the uncut belly and belly membrane are still attached. At the discharge end of the ribbing knives, a pair of cut-off knives are provided.

2

The tail feather of a redfish is extremely flexible. It will buckle and otherwise become distorted when, for example, as it moves it engages any resistance. It is highly desirable that the tail feather be passed through the zone of action of the back-slitting knives without buckling so that the back-cutting knives can make the proper incisions.

An object of this invention is to provide a fish-filleting machine having means which will dispose the tail of a fish in proper position for passage through the zone of action of the back-cutting knives.

Another object of this invention is to provide a filleting machine which will prevent the tail of a fish, fed tail leading and back downward, from buckling or otherwise becoming distorted prior to its passage through the zone of action of the back-cutting knives.

A further object of this invention is to provide a fish-filleting machine wherein the tail of a fish, fed tail leading and back downward, is elevated prior to insertion in a guide which directs the tail in proper position through the zone of action of the back-cutting knives.

An additional object of this invention is to provide a filleting machine which, in addition to the tail elevator, is also provided with means which combs the dorsal fin and guides it so that it will pass through the passage between the back-slitting knives.

Other and additional objects will become apparent hereinafter.

The objects of this invention are accomplished, in general, by providing a tail elevator before the hold-down discs and knives and in position to receive the tail and the thin portion adjacent thereto from a tilting trough through which the fish is fed.

In general, the tail elevator includes an elevator trough which is substantially U-shaped in cross-section and the sides thereof gradually taper toward the discharge end thereof. This elevator trough is of a size so that the tail feather and the thin portion of a fish, fed tail leading and back downward, passes between the sides thereof and the thicker sections of the fish ride on the upper ends of the sides. The elevator trough is tiltably mounted and normally is inclined upwardly from the entrance end thereof at an angle so that the tail of a fish will be elevated and disposed in position whereby, upon the tilting of the elevator trough downwardly, it will be inserted in a tail guide. The tail guide is located beneath the hold-down discs and above the back-slitting knives and in position to direct the tail in the aligned vertical passages formed by said cutting knives and hold-down discs. Beneath the tail guide, there is a dorsal fin comb which serves to comb the dorsal fin, and a dorsal fin guide which directs it between the back-slitting knives. The dorsal fin guide is provided with means which extends rearwardly thereof and beneath the tail guide, and serves as a support over which the back of the fish slides.

The tail elevator trough is pivotally mounted adjacent its entrance end on a tail elevator arm which also is pivotally mounted at its lower end. The tail elevator arm carries adjacent the top thereof a pair of supporting plates. The tail guide comprises a pair of tail guide members, hereinafter more fully described, and each is mounted on a tail guide support. Each tail guide support is hingedly mounted on the outer surface of the supporting plate adjacent thereto, whereby the tail guide members can be moved away from each other. Means are provided to continuously urge the tail guide supports toward each other.

The dorsal fin comb and dorsal fin guide are mounted on the inner surfaces of plates which are hingedly mounted on the inner surfaces of the supporting plates.

The plates on which the dorsal fin comb and guide are mounted are provided with equalizers so that the fish can be properly centered.

The tilting trough through which the fish is fed, tail leading and back downward, is provided with a plurality of gates which serve to maintain the fish in a vertical position (back downward) and a passage through which the dorsal fin passes. Dorsal fin combs are also provided. The tilting trough is provided with an extension at its discharge end which in normal position overlaps and terminates in spaced relationship to the tail elevator trough. The tail elevator trough is so balanced that, when the tail has been fed through the tail elevator trough in position so that it can be inserted in the tail guide, the tail elevator trough, due to the weight of the fish, is tilted and the tail is inserted in the tail guide from which it passes into the vertical passages between the hold-down discs and the back-cutting knives. The dorsal fin, upon tilting of the elevator trough, passes between the first dorsal fin comb. Further movement of the fish causes the heavier body portion to pass over the tail elevator trough and, as such heavier body portion is urged downwardly on the back-cutting knives by the hold-down discs, the elevator arm is caused to move about its pivot and, due to the shape thereof, the top of the elevator arm moves outwardly.

The tail elevator arm and the tilting trough are interconnected so that the movement of one will be transmitted to the other. Means are provided to limit the movement of the elevator arm. Means are also provided to restore the tail elevator and associated parts after a fish has passed thereover.

The fish is fed successively from a feed trough into a centering trough, and thence into the tilting trough, tail leading and back downward, by means of fingers carried on continuous chains. The fish is fed by such means until it has been positioned into the zone of action of the back-cutting knives and hold-down discs. Means are provided to adjust the tail elevator arm, and stop means are also provided to limit the movement of the tail elevator arm about its pivot. The tail elevator trough is provided with means to adjust the angularity at which said trough is disposed. The tail elevator arm is provided with means which cooperate with the bottom of the tail elevator trough to limit the downward movement thereof relative to said elevator arm.

The details of the invention will now be explained in connection with the accompanying drawings, wherein.

Referring now to the drawings, wherein like reference numerals designate like parts, the reference numeral 10 designates a tail elevator arm which is pivotally mounted at its lower end on a stud 12, carried in a bracket 14, which is secured to a bracket 16. The bracket 16 is secured by screws 18 on the frame of the machine. The screws 18 cooperate with slotted holes 20 whereby the stud shaft 12, and hence the elevator arm 10, can be adjustably positioned.

The elevator arm 10 is shaped so that the upper portion thereof will move on a large radius when such arm is moved on its pivot, and the free end 24 thereof is disposed between a pair of spaced parallel back-cutting knives 26 which are rotatably mounted on a shaft 28 driven by means not shown. The free end 24 of the arm 10 is provided with a plurality of buttons 30 which serve to position the free end in the space between the back-cutting knives 26 and preferably are formed of an anti-friction material which reduces the friction between the rotating knives 26 and the buttons 30. A pair of spaced parallel hold-down discs 34 are rotatably mounted on a shaft 36 which is driven by means not shown.

The hold-down discs 34 engage the belly side of a fish, fed tail leading and back downward, and serve to maintain the fish on the back-cutting knives 26 during the back-slitting operation. The hold-down discs 34 do not incise the fish and are yieldingly mounted whereby they will be automatically raised and lowered to accommodate the portions of the fish passing therebeneath and engaged thereby. The fish, due to the rotation of the back-cutting knives 26 and the hold-down discs 34, is projected therefrom on a pair of ribbing knives, generally indicated by the reference numeral 38.

The specific construction of the back-cutting knives 26 and hold-down discs 34 and the specific manner in which they are respectively mounted, as well as the ribbing knives 38, form no part of the present invention. The back-cutting knives and hold-down discs, together with the mounting and driving thereof, as disclosed in British Patent No. 637,126 accepted on March 3, 1950, can be used.

Likewise, the ribbing knives may be of the type and nature, and disposed and mounted, as disclosed in the aforementioned copending application.

Figure 4:
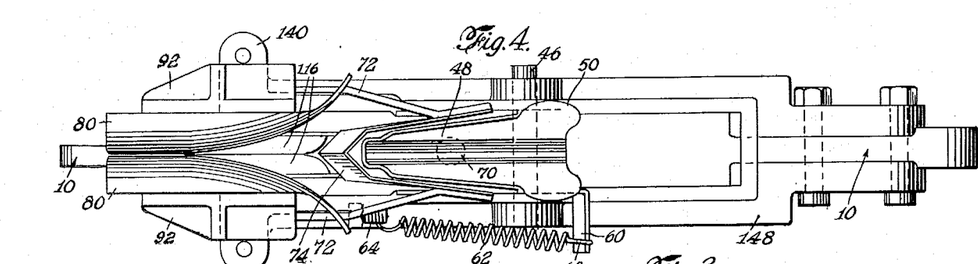
Figure 4 is a top view of the mechanism shown in Figure 2, with the tilting trough omitted for clarity.
Figures 5, 6, 7, 8, 9:
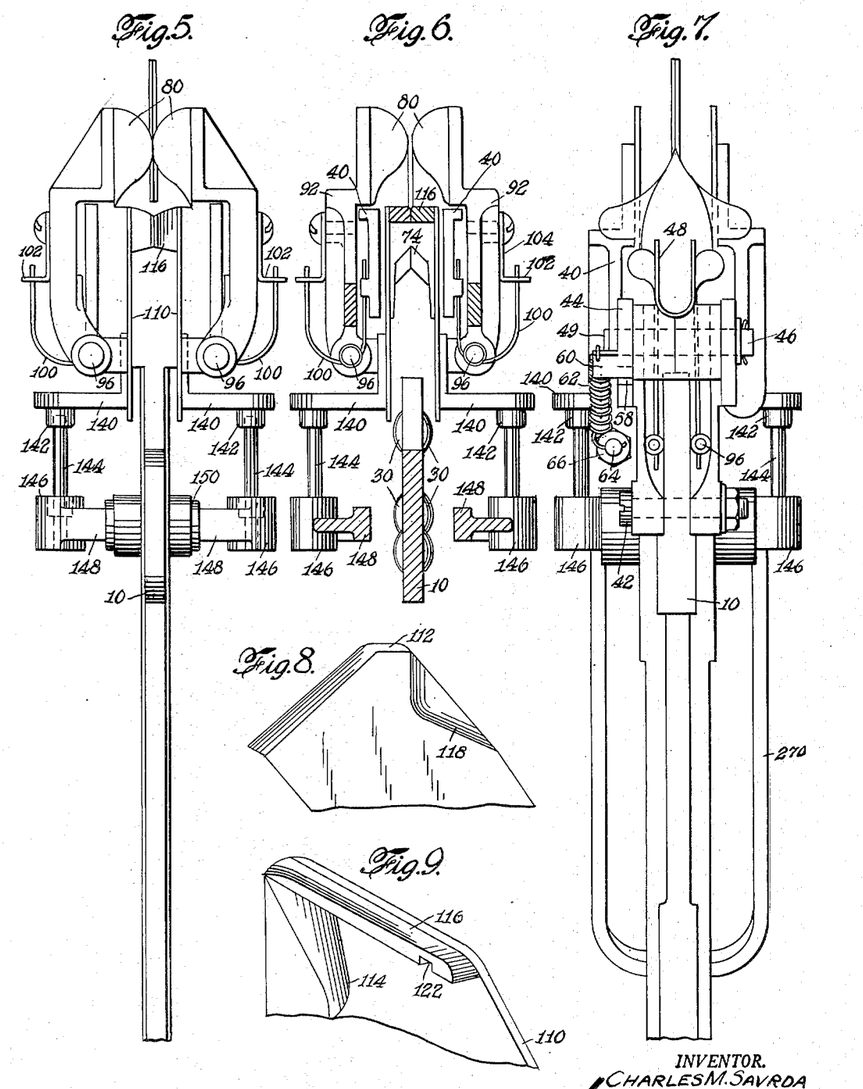
Figure 5 is an end view of the discharge end of the apparatus shown in Figure 2, the back-cutting knives and hold-down discs being omitted.
Figure 6 is a section taken on the line 6—6 of Figure 2.
Figure 7 is an end view of the entrance end of the apparatus shown in Figure 2, with the tilting trough omitted.
Figure 8 is a perspective of the dorsal fin comb element.
Figure 9 is a perspective of the dorsal fin guide element and fish-supporting element.

The top of the elevator arm 10 adjacent the free end 24 thereof is secured between a pair of side-supporting plates 40 by means of the bolts 42. Each side-supporting plate 40 is formed of an appropriately shaped casting and extends upwardly from the elevator arm 10 in parallel and spaced relationship to the other side-supporting plate 40. A bearing 44 is rotatably mounted between the side plates 40 on a horizontal pin 46, the opposite ends of which are carried by the side plates 40. As shown in Figure 7, a cotter pin 47 passing through a hole adjacent one end of the pin 46 and a head 49 on the opposite end of the pin hold said pin 46 in position. A washer 53 is preferably positioned between the side plate 40 and the cotter pin 47. A tail elevator trough 48 is secured, as by soldering, at the entrance thereof to the top of the bearing 44. The tail elevator trough 48, as shown for example in Figures 4 and 7, is provided with lips 50 at the entrance end thereof, and the side walls thereof taper toward the discharge end thereof. The elevator trough is substantially U-shaped in cross-section and is of a width so that the tail and thin (unribbed) portion of a fish can be received therein and pass therethrough. The width of the trough is less than the width of the large (ribbed) sections of the fish, whereby such sections will ride on the top free ends of the sides of the trough which are rounded. The lips 50 serve to guide the fish into and on the elevator trough as described.

Figure 1:
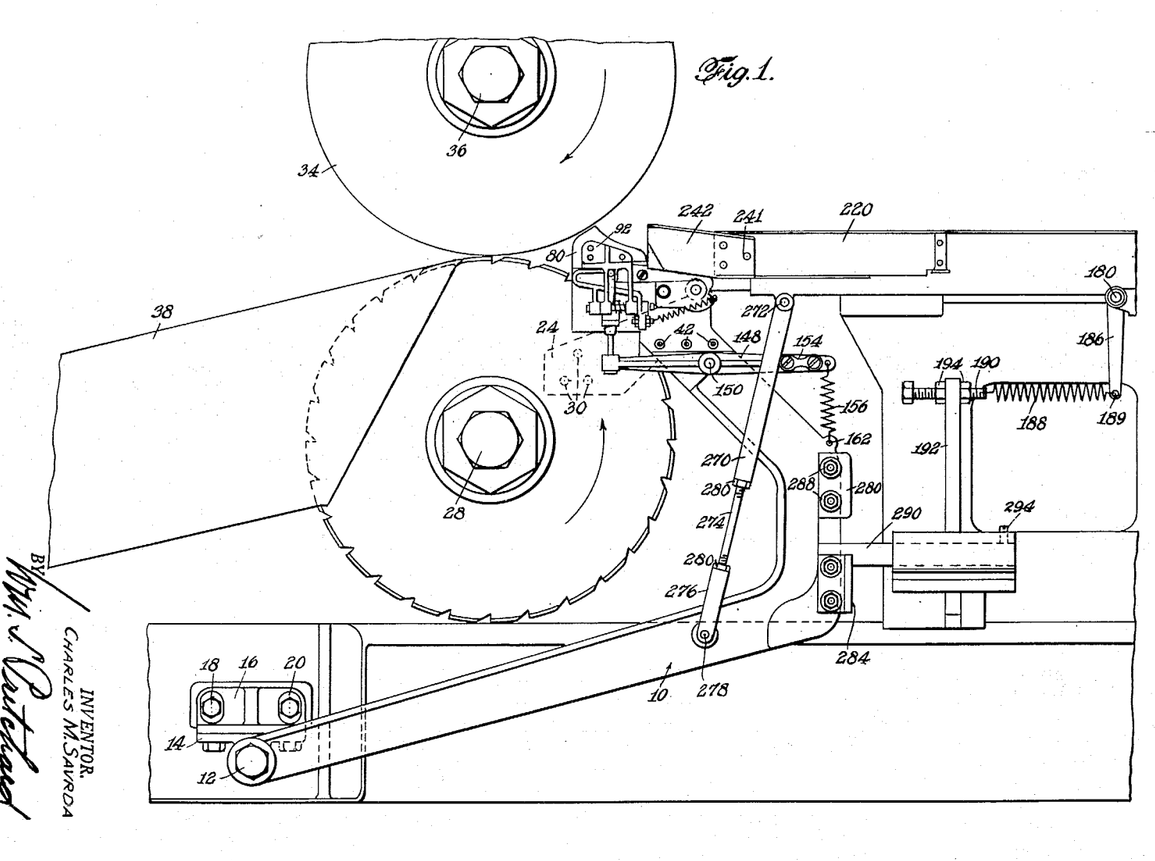
Figure 1 is a side elevation of a filleting machine containing the invention, the ribbing knives being shown diagrammatically and the feed and centering troughs being omitted.
Figure 2:
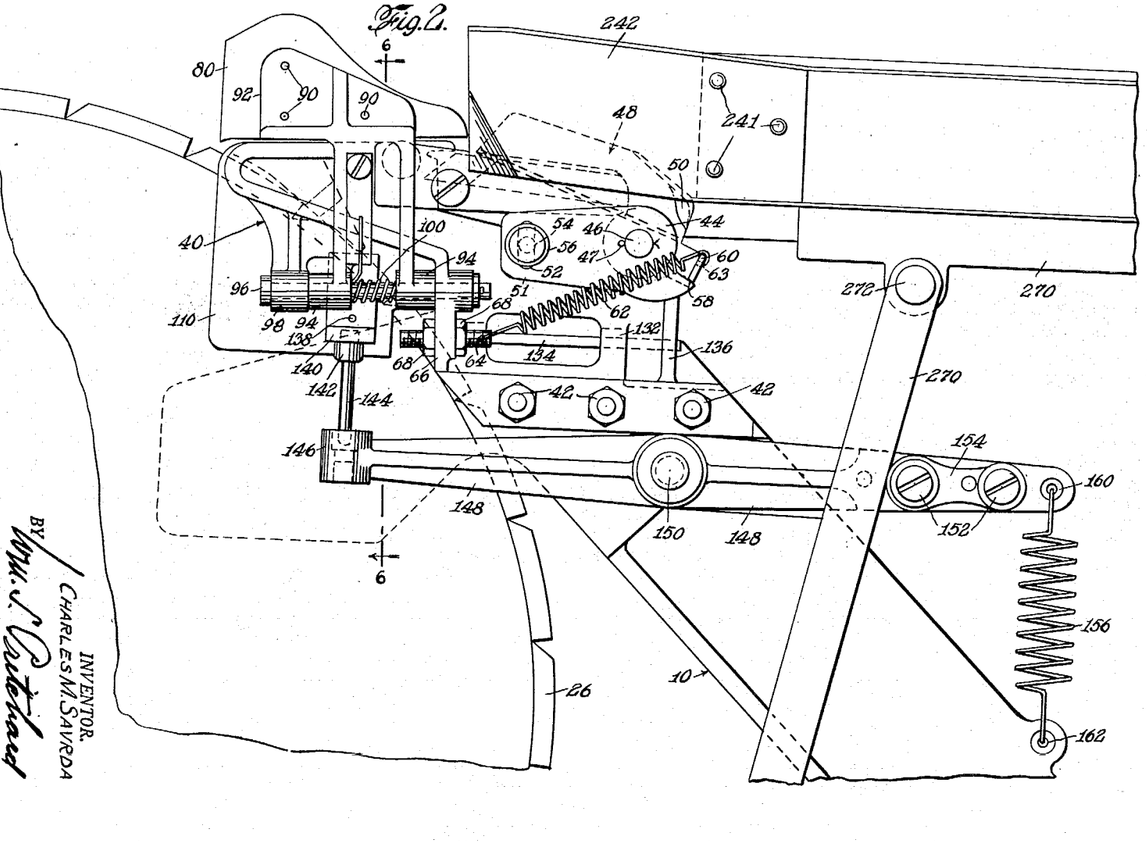
Figure 2 is an enlarged side elevation of the tail elevator, together with associated parts, and the discharge end of the tilting trough.
Figure 3:
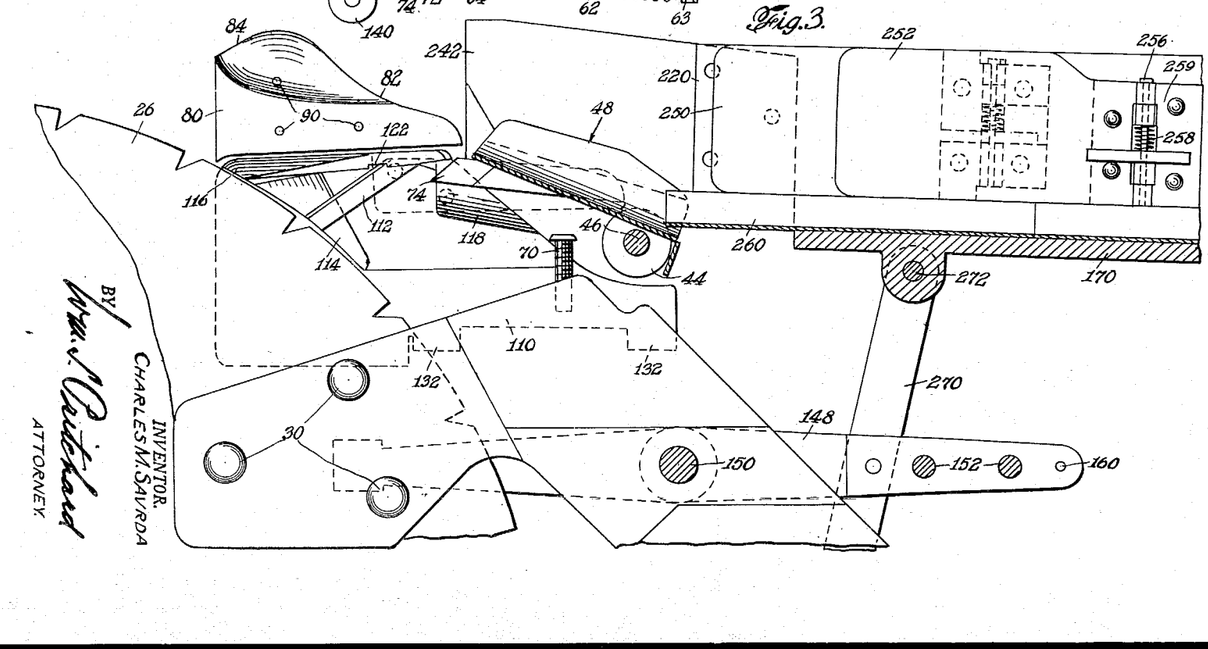
Figure 3 is a central vertical section of the mechanism shown in Figure 2.

The tail elevator trough 48 is normally positioned so that it is inclined upwardly, as shown for example in Figures 1, 2 and 3. Means are provided to adjust the angular position of the tail elevator trough 48. In the form shown (see Figures 1 and 2), a stop plate 51 is rotatably mounted on the pin 46 adjacent one of the side plates 40. The stop plate 51 is provided with a slot 52 which cooperates with a screw 54 carried by the side plate 40. A nut 56 secures the stop plate 51 in adjusted position. The stop plate 51 is provided with a projection 58 constituting a stop element which is in position to cooperate with the free end of a finger 60 secured, as by soldering, to the bearing 44. A spring 62 has one end secured in an eye 63 of the finger 60, the other end being secured to a screw 64 which is threadedly mounted in a boss 66 of the side plate 40. Nuts 68 secure the screw 64 in position. By adjustment of the screw 64, the tension on the spring can be adjusted as desired. The tension of the spring is such that it will urge the finger 60 to move clockwise until it is in contactual relationship with the stop element 58 and further clockwise movement of the finger 60 limited. By adjusting the stop plate 51 on the pin 46, the stop element 58 can be adjusted relative to the finger 60 so as to dispose the tail elevator trough 48 secured thereto at any desired angle relative to the horizontal.

For reasons which will become apparent, the elevator arm 10 is provided with an adjustable stop 70 which is adapted to cooperate with the bottom of the elevator trough 48.

As shown in Figures 3 and 4, there is provided a pair of comb-supporting plates 72, each of which is appropriately secured at its rear end to the side-supporting plate 40 adjacent thereto. Each plate 72 is of such shape that the free ends thereof are in parallel spaced relationship. A comb element 74 is secured to each of the comb-supporting plates 72 adjacent the free end thereof. In the form shown, each comb element is secured at its forward end to the respective comb-supporting plate 72, as by riveting and/or soldering. Each comb element is bent inwardly at the forward end thereof and disposed so that the free ends thereof converge as shown in Figure 4. Each comb element 74 is of such dimensions so that the tail elevator trough 48 will clear the same during the tilting of such trough. As shown in Figure 4, the exit end of the trough 48 terminates before the converging portions of the comb. The comb is, as will hereafter be more fully described, positioned so that the dorsal fin of a fish will pass therebetween after the tail elevator trough 48 has been tilted.

In advance of the tail elevator trough 48, there is provided a tail guide which consists of a pair of tail guide elements 80. Each of the tail guide elements 80 is curved inwardly (as shown in Figures 3, 5 and 6) and normally is in contactual relationship. Each tail guide element 80 is also curved at the front thereof so as to provide a flaring mouth at the entrance end. Each tail guide element 80 is cut away and provided with an arcuate edge 82 so that the pushers (not shown) which feed the fish will clear the tail guide. The tail guide is positioned in close proximity to the hold-down discs 34, and each tail guide element 80 is formed with an arcuate edge 84 in order to permit the hold-down discs to clear the same, as shown in Figure 1. In general, the tail guide elements are substantially of the form and shape shown.

Each tail guide element 80 is secured by rivets 90 to a tail guide support 92. Each tail guide support 92 is hingedly mounted on the outer surface of the side-supporting plate 40 adjacent thereto. In the form shown, each tail guide support 92 is provided with a pair of bosses 94 at the lower end thereof and such bosses 94 are mounted on a pin 96 carried in bosses 98 on the respective side plate. A torsion spring 100 continuously urges each of the tail guide supports 92 toward each other.

In the form shown, each torsion spring 100 is coiled around the pin 96 and has one end thereof secured in an ear 102 carried by a bracket 104 and secured to the tail guide support 92. The other end of the spring 100 is secured onto the respective side plate 40. The movement of the tail guide elements toward each other is limited when they are in contactual relationship and they can be moved away from each other against the tension of the spring 108.

On the inner surface of each of the side plates 40, a second plate 110 is positioned. As shown in Figures 3-7 inclusive, each plate 110 carries a dorsal fin comb element 112, a dorsal fin guide element 114 and a fish-supporting element 116. Each fin comb element 112 is secured, as by soldering, adjacent the front end thereof to the plate 110, and the forward end is inclined and bent inwardly so that the free end of each of the fin comb elements 112 is in contactual or close relationship. Due to the fact that each comb element 112 is secured at one end to the plate 110, the comb elements are independently yieldable and can move toward and away from each other, the movement toward each other being limited when they are in contactual relationship. Each fin comb element is provided with a pocket 118 to permit clearance by the exit end of the elevator trough when it is tilted.

The free ends of the comb elements 112 which constitute the dorsal fin comb are inclined upwardly and the lower end of each overlaps onto the dorsal fin element adjacent thereto.

Each dorsal fin guide element 114 is secured in any appropriate manner to the adjacent plate 110 and is curved so as to provide a flaring entrance, whereby the dorsal fin, upon leaving the comb 112, will be passed between such guides.

Each dorsal fin guide element 114 is, at its upper end, formed with a horizontally disposed curved member 116 which constitutes a support on which the back of the fish rides. Each of the horizontal elements or back-supporting means is provided with a slot 122 in which the top edge of the adjacent comb element 112 is disposed. By this arrangement, each comb element is provided with necessary clearance so that such comb elements can yield without interference by the fish support 116. If desired, the dorsal fin guide element 114 and the fish support 116 can be made of one piece or of two pieces, each appropriately secured to the plate 110. It is to be noted that, when the back of a fish rides on the back support, the dorsal fin of the fish will pass between the elements 116 constituting such fish support.

As shown in Figure 3, the fine guide elements 114 and the back-supporting means 116 terminate in close proximity to the back-cutting knives 26, and each of such elements is curved so that they can be disposed in such close proximity.

In general, the comb elements 112, the dorsal fin guides 114, and the fish supports 116 are substantially of the shapes shown.

Each plate 110 is hingedly mounted on the inner surface of the side-supporting plate 40 adjacent thereto. In the form shown, each plate 110 is provided with a pair of spaced bosses 132 at the lower end thereof, and these bosses are mounted on a pin 134 carried by bosses 136 on the respective side support plate 40. It is to be noted that each plate 110 overlaps onto the back-slitting knife 26 adjacent thereto.

In order to equalize the movement of each plate 110 with the other, there is provided an equalizing or compensating mechanism. With this in view, to each plate 110 there is secured in any appropriate manner, as by rivets 138, a retaining element 140 which carries an inverted cup 142. One end of a compensating rod 144 is disposed in the inverted cup 142, the other end thereof being disposed in a cup 146 carried by a compensating lever member 148. As is apparent from the drawings, each plate is provided with the compensating means. The two compensating lever members 148 are pivotally mounted on a stud 150 and are secured together by screws 152 to form a unitary compensating lever having a yoke at the rear end thereof to permit clearance by the back-cutting knives 26 and the elevator arm 10. Preferably, also, a link 154 cooperates with the screws 152. Instead of making the lever by securing together the lever element, it can be made of one piece. A spring 156, having one end thereof secured in an eye 160 of the compensating lever and the other end secured in an eye 162 of the tail elevator arm 10, continuously urges the compensating levers upwardly whereby each of the plates 110 are urged inwardly, the inward movement being limited when the guide elements 114 and the fish supports 116 are in close proximity. When either of plates 110 carrying the guide element 114 or fish support 116 is moved outwardly and away from the other plate 110, such movement will be transmitted from the respective plate 110 to the compensating lever and the other plate 110 will be free of resistance due to the lowering of its compensating rod 144 and the fish will tend to move toward the plate 110, which is of least resistance, and thereby be centralized.

A fish to be filleted is positioned in a feed trough and conveyed therethrough into and through a centering trough by means of fingers carried on a continuous chain. The details of construction of the feed trough, the centering trough, and the means for conveying the fish therethrough, form no part of this invention and are therefore not shown. A fed trough, a centering trough, and means for feeding a fish therethrough which can be used are shown in the U. S. Hunt Patent 2,325,680.

From the centering trough (not shown), the fish is fed into a tilting trough which will now be described. Referring now to Figures 10-14 inclusive, the tilting trough has a fin guide plate 170 which is provided with a channel 172 through which the dorsal fin passes. The fin guide plate 170 is secured at the entrance end to a plate 174 which is provided with a journal 176 and which, in turn, is pivotally mounted on a pivot pin 180 carried in bosses 182 carried by brackets 184 appropriately mounted on a support 185 secured to the frame member 187 by bolts 191. The journal 176 is provided with a downwardly extending arm 186. A spring 188 has one end thereof secured in an eye 189 of the arm 186, and the other end thereof is secured in an adjustable screw 190 mounted in a support 192. The screw 190 is secured in adjusted position by nuts 194. In normal position, the tension of the spring 188 is adjusted so that the fin guide plate 170 lies in a substantially horizontal position.

The tilting trough is provided with means to maintain the fish in vertical position, back downward, and also with means to comb the dorsal fin. Adjacent the entrance end of the tilting trough there is provided a gate formed of a pair of swivel guide plates 195 which are disposed so that normally they will converge in the direction of travel of the fish. Each of the plates 195 is secured in a slot in a post 196. The post is rotatably mounted in a journal 198 carried by a bracket 200. Adjacent the bottom of each post 196, there is provided a gear segment 202. The two gear segments 202 are in cooperative relationship, and an arm 204 is secured to each gear segment 202 as by rivets 206. A spring 208 connects the arms 204 together and urges them toward each other. Each of the plates 195 is provided with a rod 210, and, in normal position, the spring 208 causes the gear segments 202 to rotate the post 196 so that the rods at their free ends are in contactual relationship. It is manifest that the gear segments 202 constitute equalizing means and that movement of one of the swivel plates 195 will cause an equalizing movement to the other swivel plate 195.

Figure 10:
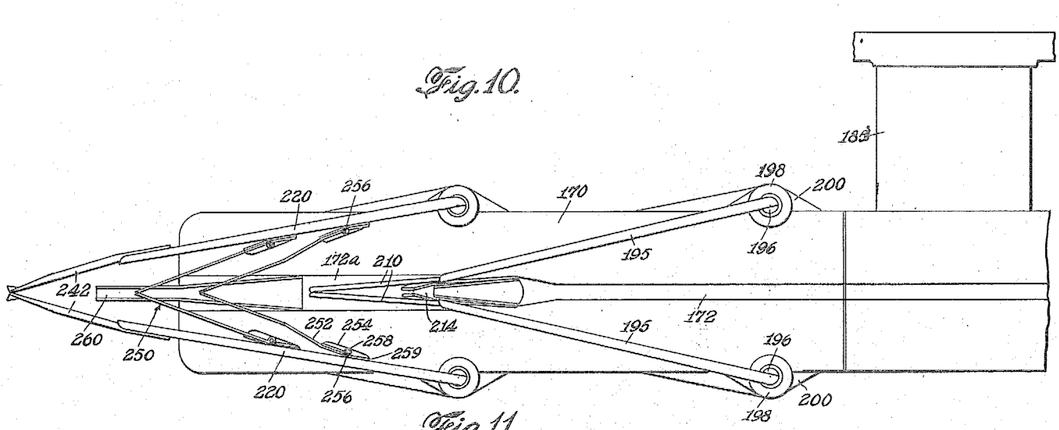
Figure 10 is a top view of the tilting trough.

Between the swivel guide plates 195 and before the free ends thereof, the channel 172 is enlarged as indicated by the reference numeral 172a. A dorsal fin guide element 214 is secured to the side wall of the enlarged channel 172a. Each dorsal fin element 214 is inclined upwardly and the free ends thereof terminate in close proximity to each other. In the form shown, the swivel guide plates 195 of the first gate terminate at the entrance end to a second gate formed of a pair of swivel guide plates 220, and the rods 210 carried by the swivel plates 195 extend between the swivel guide plates 220, as shown in Figure 10.

Figures 12, 13, 14:
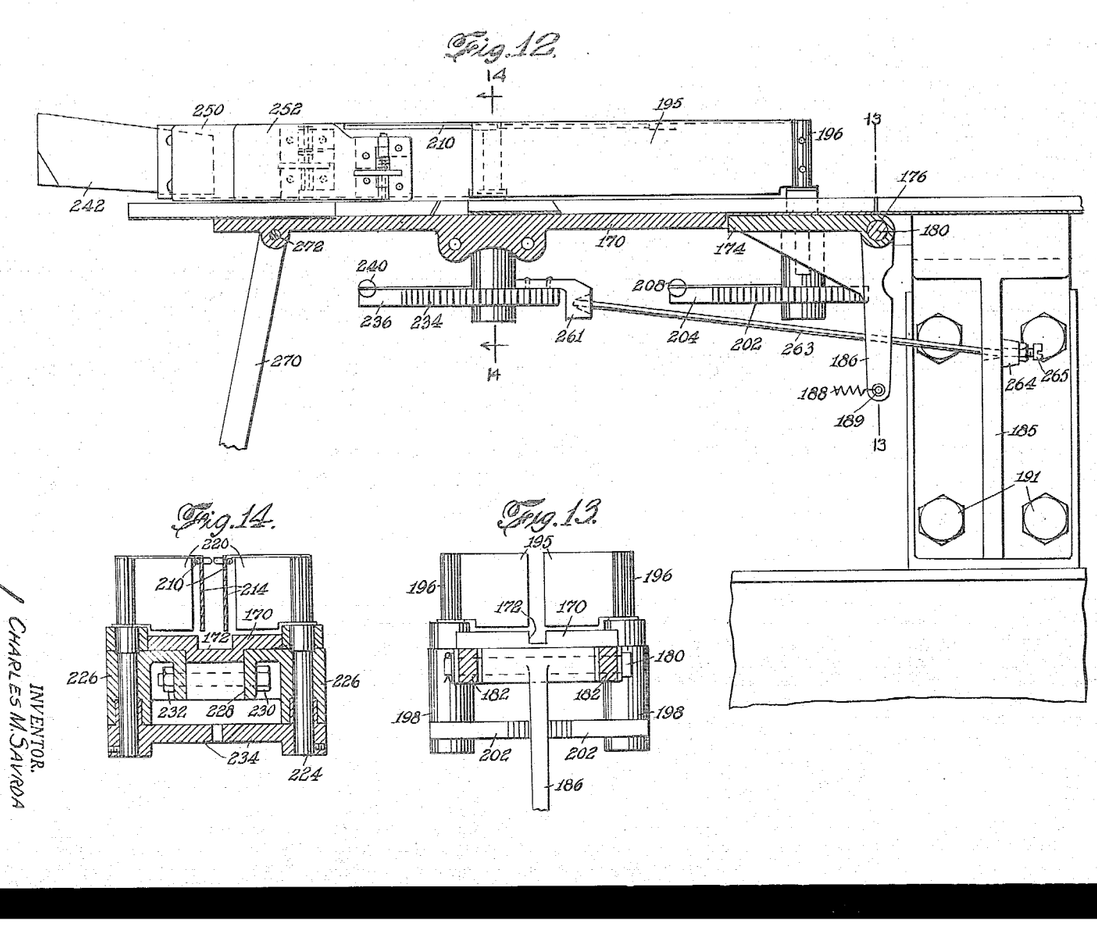
Figure 12 is a vertical section of the tilting trough.
Figure 13 is a section taken on the line 13—13 of Figure 10.
Figure 14 is a section taken on the line 14—14 of Figure 10.

Each of the swivel guide plates 220 is, as shown in Figure 14, secured in the slot of a post 224, which is rotatably mounted in a journal 226 carried by a bracket 228. The brackets 228 are secured by means of a bolt 230 and a nut 232 to a fin guide plate 170, as shown in Figures 12 and 13. A segmental gear 234 is secured on each post 224 adjacent the bottom thereof. The segmental gears 234 are in cooperative relationship and an arm 236 is secured, as by rivets 238, to each of the segmental gears. The free ends of the arms 236 are connected by a spring 240. At the forward end of each swivel plate 220, there is secured, as by rivets 241, a plate 242. These plates 242 are inclined upwardly, as shown in Figure 12, and converge in the direction of the feed of a fish in the trough. As shown in Figure 1, the tail elevator trough 48 is positioned between the plates 242.

Each gear segment 202 and 234 has secured thereto a stop element 244 which serves to limit the inward movement of the respective gates. In practice, the stop elements 244 are such that the swivel plates of each gate are slightly spaced at their respective forward end so as to receive the tail of the fish.

Intermediate the swivel plates 220, there are provided two tail guides 250. As shown in Figure 10, each tail guide 250 comprises a pair of spring elements 252 arranged so that their free ends are in spaced relationship to each other, the opposite end of each spring element being secured to an element 254 pivotally mounted intermediate its ends on a pin 256. A spring 258 normally urges the free end of each of the elements 252 toward each other, and such movement is limited by a stop 259 which cooperates with the respective swivel plate. The stop 259 also serves to position the free ends of the respective spring elements 252 in spaced relationship to receive the tail of a fish. The tail guides 250 are of approximately the same height as the gate members.

An extension 260 is secured, as by soldering, in the enlarged channel 172a in advance of the rods 210. The extension 260 has sides which taper inwardly and then extend parallel. The parallel portion of the extension normally extends in and terminates in spaced relationship to the bottom of the tail elevator trough 48. In general, the swivel plates of the gates engage the sides of the fish and serve to maintain the fish in proper vertical position so that it (the fish) can be fed to the tail elevator trough. The rods 210 aid in supporting that portion of the fish which has passed from the first gate and the plates 242 support the fish on the tail elevator trough 48.

Figure 11:
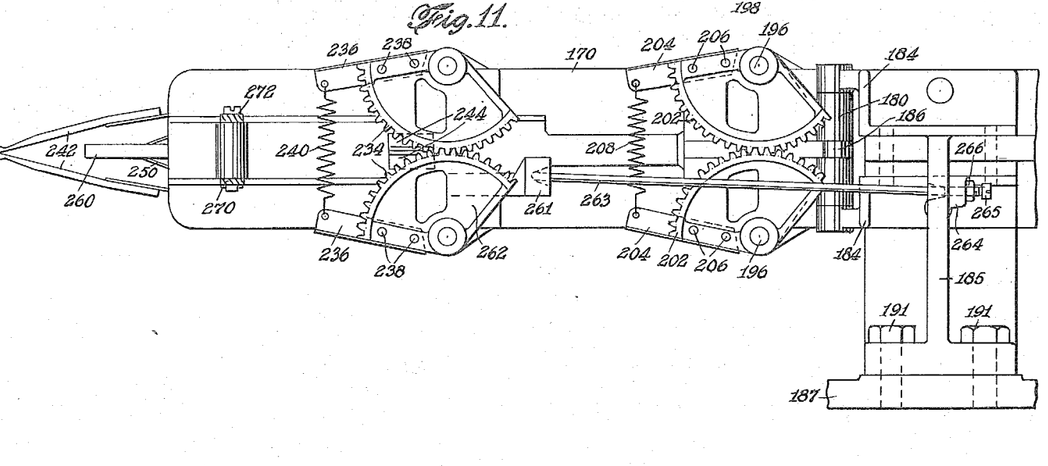
Figure 11 is a bottom view of the tilting trough.

Referring now to Figures 11 and 12, a cup 261 is carried on one end of an arm 262 which is appropriately secured to one of the gear segments 234. One end of a rod 263 is positioned in the cup. The other end of the rod 263 is positioned in the support 185. Adjacent the end of the rod 263 in the support 185 there is a boss 264 in which an adjusting screw 265 is provided. A lock nut 266 secures the adjusting screw in adjusted position. When the tilting trough is tilted as hereafter described, the rod 263 will cause the second gate member 220 to open and permit such gate and the plates 242 to clear the tail elevator trough.

As shown in Figure 1, the tilting trough and the elevator arm 19 are interconnected whereby movement of the tilting trough is transmitted to the elevator arm and vice versa. The legs of a U-shaped member 270 are secured at the upper end thereof to the tilting trough by means of a screw 272 and the base of the U-shaped member 270 is threadedly secured to a rod 274. The other end of the rod 274 is threadedly secured in the base of a second U-shaped member 276, the legs of which are secured to the elevator arm 19 at 278. The elevator arm 19 passes between the legs of both of the U-shaped members 270 and 276, and the compensating lever 148 passes between the legs of the U-shaped member 270. By proper manipulation of the rod 274, the connection between the elevator arm 19 and the tilting trough can be adjusted. Lock screws 280 secure the rod in adjusted position.

The elevator arm 19 is provided with a pair of stop elements 284 and 286. Each of these stop elements is a forked member, with the arm 19 passing between the parallel legs of the fork. Each of the stops 284 is provided with slots and is secured in position on the arm 19 by means of the bolts 288. Due to the slots, the stop 284 can be adjusted toward and away from each other. A stop element 290 is provided with a forked end in which the arm 19 is positioned. The stop element 290 is mounted in a housing 292 and can be adjusted in position so that the forked end thereof rides over the elevator arm and cooperates with either the top or bottom stops, for reasons which will become apparent hereinafter. A set screw 294 secures the stop element 290 in adjusted position.

The tail elevator arm 19 can be appropriately connected to a dash pot (not shown) to eliminate shocks during operation, especially at high speeds.

In operation, a decapitated fish is fed, tail leading and back downward, through a fed trough and a centering trough by pushers secured to a continuous chain traveling in horizontal planes, as disclosed in U. S. Patent 2,325,680. The fish is fed from the centering trough into and through the tilting trough, the dorsal fin entering the channel 172. As the fish is fed through the tilting trough, it passes successively between the two gates and appurtenant elements whereby the fish, tail leading and back downward, is maintained in a substantially vertical position. During its passage through the first gate, the dorsal fin guide 214 cooperates with the dorsal fin. During passage through the second gate, the tail passes between the tail guides 250 which maintain the tail in the extension 260. As the thicker sections of the fish pass between the gates, the swivel plates thereof move outwardly to accommodate the same. After a fish passes from the gates, the swivel plates thereof are restored to original position. Prior to leaving the second gate, the back of the fish rides on the extension 260 and the dorsal fin passes in the channel of such extension. As the fish leaves the extension, the tail portion thereof enters and passes through the elevator trough 48 and the plates 242 serve to maintain the fish in vertical position.

Figure 15:
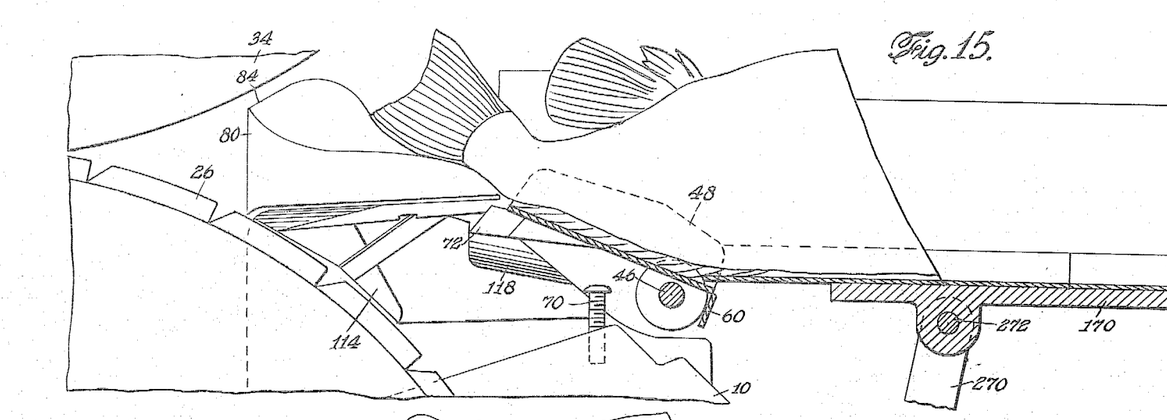
Figure 15 is a diagrammatic view showing the fish and its relation to the parts of the mechanism at the beginning of the operation and before tilting has been effected.
Figure 16:
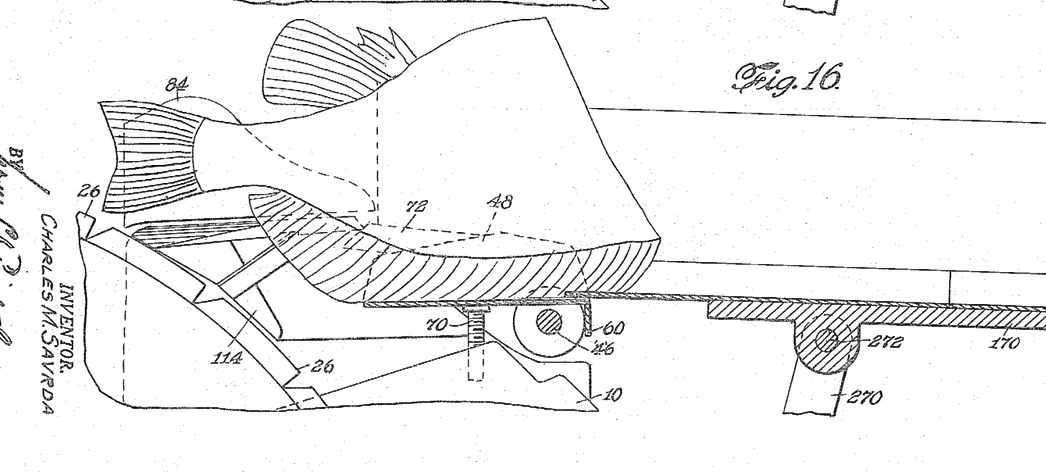
Figure 16 is a diagrammatic view showing the relationship of parts after tilting of the tail elevator and tilting trough have been effected.

When the tail of the fish has been advanced through the tail elevator trough 48 so that it is in position to be inserted in the tail guide 80, as shown in Figure 15, the pressure caused by the weight of the fish supported on the elevator trough 48 or the thickness of the tail end of the fish causes such tail elevator trough to tilt. The tilting of the trough 48 causes the tail of the fish to be inserted in the tail guide 80, and the downward movement of the trough 48 is limited by the stop 70. Upon the tilting of the elevator trough 48, the dorsal fin is disposed in position to pass through the first dorsal fin comb 72, as shown in Figure 16. As the fish is fed, the tail is guided by the tail guide into position between the hold-down discs and cut-off knives. When a heavier portion of the fish is fed into the zone of action of the hold-down discs, the latter urges it downwardly on the back-cutting knives, with the result that the pressure exerted on the fish causes the elevator arm 10 to move clockwise about its pivot 12. Due to the interconnection between the elevator arm 10 and the tilting trough, the latter is also tilted about its pivot 180. When the elevator arm 10 moves about its pivot 12, the upper end thereof moves substantially in a horizontal path toward the extension 260, and the latter engages the elevator trough and extends therein, as shown in Figure 16. When the tilting trough tilts, the rod 263 cooperating with cup 261 on the gear segment 234 causes the gate members 220 and hence the plates 242 to move away from each other and thus clear the elevator trough 48 while still guiding the fish. When the heavier body portion of the fish passes from the extension 260, it rides over the top edges at the exit end of the elevator trough 48.

The dorsal fin, after passing through the first dorsal fin comb 74, passes between the back-supporting elements 116, through the second dorsal fin comb 112, and thence between the dorsal fin guide 114, while the back of the fish rides over the back support 116. Upon leaving the back support 116, the fish is fed into the zone of action of the back-cutting knives and the dorsal fin is directed into and fed between the back-cutting knives.

As the fish is fed, the tail guide elements 80 move away from each other to accommodate the enlarging sections of the fish. This movement is controlled by the torsion spring action of the tail guide support member. The tail guide also serves to direct the belly fin guide as it passes therethrough.

When the elevator trough 48 is in tilted position, the exit end thereof is disposed in the pocket 118. The dorsal fin passes between the comb elements 112 which, as previously described, are independently yieldable. The dorsal fin comb elements 112 also serve to direct the dorsal fin into position between the dorsal fin guides 114.

The equalizing mechanism hereinbefore set forth and associated with each of the plate 110 serves to position or maintain the fish in proper position for feeding the dorsal fin between the back-cutting knives.

After the fish has left the tail elevator trough 48, the latter will be restored to its normal upwardly inclined position by the spring 62, and the tilting trough will be restored to its original position by the spring 188. Due to the inner connection of the tilting trough and the elevator arm 10, the latter will also be restored to its original position. The stop element 290 cooperating with the stops 284 limit the movements of the arm 10, and hence the tilting trough movements about its pivot also are limited.

The fish is fed through the apparatus at a very rapid rate, with the result that the various movements of the elevator trough, elevator arm, and tilting trough are effected almost simultaneously.

Since it is obvious that various changes and modifications may be made in the above description without departing from the nature or spirit thereof, this invention is not restricted thereto except as set forth in the appended claims.

I claim:

1. In a fish filleting machine having a pair of spaced rotatably mounted circular knives adapted to make, in a fish fed thereto tail leading and back downward, a pair of spaced incisions extending upwardly from the back, commencing adjacent the tail and progressing forwardly of the fish, together with fish feeding means for advancing a fish tail leading and back downward to said knives; in combination, mechanism for presenting said fish to said knives as they advance in such manner as to direct their tail feathers between vertical planes passing through the leading cutting edges of said knives, comprising a tail elevator trough, means for pivotally mounting said trough on said machine in alignment with said fish feeding means for movement about a horizontal axis disposed transversely of said machine, said elevator trough being mounted to assume a normally inclined position projecting into the path of a fish advancing through said fish feeding means, said elevator trough being of a length less than the length of the smallest fish to be filleted on said machine, whereby the leading tail portion of a fish as it advances into said elevator trough is urged into elevated angular relation with respect to the trailing portion of the fish, tail guides mounted on said machine along the path of fish advance, one on either side thereof between said elevator trough and said knives, and means including said pivot means balancing said elevator trough so that as a leading tail portion of a fish advances beyond said elevator trough and between said tail guides pressure of the trailing portion of the fish on said trough will tilt the same and said leading tail portion will advance into the space between said tail guides with a component of downward motion.

2. Mechanism as claimed in claim 1 having adjustable stops for limiting the tilting movement of the tail elevator trough relative to its axis.

3. Mechanism as claimed in claim 1 having a dorsal fin comb consisting of two comb elements extending towards the path of fish advance one on either side thereof between said elevator trough and said tail guide to comb the dorsal fin after said fin has passed over and off of said elevator trough.

4. Mechanism as claimed in claim 1 having two fish supporting elements positioned beneath the tail guides one on either side of the path of fish advance to support the back side of the fish as the fish advances past said tail guides to said knives.

5. Mechanism as claimed in claim 4 wherein the fish supporting elements are spaced apart and permit the dorsal fin to extend downwardly therebetween as the fish advances thereover.

6. Mechanism as claimed in claim 1 having two fish supporting elements positioned beneath said tail guides one mounted on either side of the path of fish advance to support the back of the fish as the fish advances past said tail guides to said knives, a dorsal fin comb comprising two elements one mounted on either side of the path of fish advance, said comb being positioned beneath said supporting means, and a dorsal fin guide mounted between said fin comb and said knives for directing the dorsal fin between the vertical planes passing through the leading cutting edges of the knives after said fin has been combed by the dorsal fin comb.

7. Mechanism as claimed in claim 6, wherein the dorsal fin comb consists of a pair of oppositely disposed, independently yieldable comb elements.

8. Mechanism as claimed in claim 7, wherein the fish supporting element and the dorsal fin comb element on each side of said path are mounted on a common plate, said two plates being mounted for pivotal movement towards and away from the path of fish advance and equalizing mechanism for pivoting said plates simultaneously like amounts in opposite directions when either of said plates is pivoted by contact of a fish therewith.

9. Mechanism as claimed in claim 1, wherein each of said tail guides is mounted on the frame of said machine for pivotal movement towards and away from the path of fish advance and means for continuously urging said guides towards said path.

10. Mechanism as claimed in claim 1, wherein the axis of the elevator trough is carried on an arm pivotally mounted on the frame of said machine rearwardly relative to said trough axis for movement about a transverse horizontal axis from an upper to a lower position, whereby the pressure of a fish on said elevator trough when it reaches its limit of downward motion about its own axis, will pivot said arm in an opposite direction relative to the frame of the machine to lower further the pivoted end of said elevator trough relative to said knives.

11. Mechanism as claimed in claim 10, wherein the axis of the elevator trough is mounted on said arm for movement on a much larger radius around said arm axis than the radius of movement of the elevator trough about its axis.

12. In a fish filleting machine having a pair of spaced rotatably mounted circular knives adapted to make, in a fish fed thereto, tail leading and back downward, a pair of spaced incisions extending upwardly from the back commencing adjacent the tail and progressing forwardly of the fish, together with fish feeding means for advancing a fish tail leading and back downward to said knives, and wherein the feeding means includes a tilting trough mounted for pivotal movement of its discharge end around an axis disposed adjacent its leading end, and otherwise comprising the mechanism claimed in claim 1, the combination wherein the said tilting trough extends into the elevator trough and a link connects the elevator arm and the tilting trough whereby movement of one is transmitted to the other.

13. In a fish filleting machine having a pair of spaced rotatably mounted circular knives adapted to make, in a fish fed thereto, tail leading and back downward, a pair of spaced incisions extending upwardly from the back commencing adjacent the tail and progressing forwardly of the fish, together with fish feeding means for advancing a fish tail leading and back downward to said knives, and wherein the feeding means includes a tilting trough mounted for pivotal movement of its discharge end around an axis disposed adjacent its leading end, and otherwise comprising the mechanism claimed in claim 1, the combination wherein the said tilting trough extends into the elevator trough and a link connects the elevator arm and the tilting trough whereby movement of one is transmitted to the other, and wherein the said tilting trough carries plates to maintain a fish back downward in vertical position while it is on said elevator trough.

14. Mechanism as claimed in claim 13, wherein said plates converge towards the path of fish advance and have associated mechanism to move said plates apart as said trough tilts to insure that said plates carried by said tilting trough clear said elevator trough.

15. In a fish filleting machine having a pair of spaced rotatably mounted circular knives adapted to make, in a fish fed thereto tail leading and back downward, a pair of spaced incisions extending upwardly from the back, commencing adjacent the tail and progressing forwardly of the fish, together with fish feeding means for advancing a fish tail leading and back downward to said knives; in combination, mechanism for presenting said fish to said knives as they advance in such manner as to direct their tail feathers and dorsal fins between vertical planes passing through the leading cutting edges of said knives, comprising dorsal fin guiding elements and a tail elevator trough, in advance of the fin guiding elements, inclined upwardly in the line of fish advance to raise the tail feathers above the normal line of fish advance so they clear the dorsal fin guiding elements, said trough being tiltably mounted so that the weight of the trailing portion of the fish tilts said trough downwardly after said feathers have cleared said elements to present the dorsal fin to said elements.

16. In a fish filleting machine having a pair of spaced rotatably mounted circular knives adapted to make, in a fish fed thereto tail leading and back downward, a pair of spaced incisions extending upwardly from the back, commencing adjacent the tail and progressing forwardly of the fish, together with fish feeding means for advancing a fish tail leading and back downward to said knives; in combination, mechanism for presenting said fish to said knives as they advance in such manner as to direct their tail feathers between vertical planes passing through the leading cutting edges of said knives, comprising two fish supporting elements positioned to support the back of the fish as the fish advances towards said knives, said elements being spaced apart to permit the dorsal fin to extend downwardly therebetween as the fish advances thereover, a tail elevator trough, means for pivotally mounting said trough on said machine in alignment with said fish feeding means for movement about a horizontal axis disposed transversely of said machine, said elevator trough being movable to assume a normally inclined position projecting into the path of a fish advancing through said fish feeding means, the rear end of said trough being normally disposed well above the plane of the top of said two supporting elements, said elevator trough being of a length less than the length of the smallest fish to be filleted on said machine, whereby the leading tail portion of a fish as it advances onto said elevator trough is urged into elevated angular relation with respect to the trailing portion of the fish, and means including said pivot means balancing said elevator trough so that as the leading tail feathers of a fish advance beyond said elevator trough, they are spaced above and clear said fish supporting elements by reason of the upward inclination of said elevator trough, pressure of the trailing portion of the fish on said trough subsequently tilting the trough so that the trailing portion will be supported on said elements with the dorsal fin extending downwardly therebetween.

CHARLES M. SAVRDA.

REFERENCES CITED

The following references are of record in the file of this patent:

UNITED STATES PATENTS

| Number | Name | Date |
|---|---|---|
| 2,325,680 | Hunt | Aug. 3, 1943 |
| 2,424,057 | Savrda | July 15, 1947 |
| 2,427,626 | Savrda et al. | Sept. 16, 1947 |
| 2,431,893 | Savrda | Dec. 2, 1947 |